(12) United States Patent
McCullough et al.

(10) Patent No.: US 9,409,046 B2
(45) Date of Patent: Aug. 9, 2016

(54) METHOD FOR STABILIZATION AND/OR FIXATION OF LEACHABLE METALS

(75) Inventors: Thomas P. McCullough, Indianapolis, IN (US); Gary Joel Meyer, Indianapolis, IN (US)

(73) Assignee: REMEDIUM SERVICES GROUP, LLC, Carmel, IN (US)

( * ) Notice: Subject to any disclaimer, the term of this patent is extended or adjusted under 35 U.S.C. 154(b) by 956 days.

(21) Appl. No.: 12/259,578

(22) Filed: Oct. 28, 2008

(65) Prior Publication Data

US 2009/0118564 A1 May 7, 2009

Related U.S. Application Data

(60) Provisional application No. 60/984,392, filed on Nov. 1, 2007, provisional application No. 61/075,099, filed on Jun. 24, 2008, provisional application No. 61/102,969, filed on Oct. 6, 2008.

(51) Int. Cl.
| | |
|---|---|
| *A62D 3/33* | (2007.01) |
| *A62D 101/43* | (2007.01) |
| *B01D 53/64* | (2006.01) |
| *A62D 101/24* | (2007.01) |

(52) U.S. Cl.
CPC *A62D 3/33* (2013.01); *B01D 53/64* (2013.01); *A62D 2101/24* (2013.01); *A62D 2101/43* (2013.01); *B01D 2251/402* (2013.01); *B01D 2251/404* (2013.01); *B01D 2257/60* (2013.01)

(58) Field of Classification Search
None
See application file for complete search history.

(56) References Cited

U.S. PATENT DOCUMENTS

| | | | | |
|---|---|---|---|---|
| 3,230,103 A | * | 1/1966 | Minnick | 106/707 |
| 3,962,080 A | * | 6/1976 | Dulin et al. | 588/317 |
| 4,018,867 A | * | 4/1977 | Lee | 588/318 |
| 4,671,882 A | | 6/1987 | Douglas et al. | |
| 4,829,107 A | * | 5/1989 | Kindt et al. | 524/3 |
| 4,889,640 A | | 12/1989 | Stanforth | |
| 4,996,032 A | * | 2/1991 | Stowe et al. | 423/243.09 |
| 5,037,479 A | | 8/1991 | Stanforth | |
| 5,057,194 A | * | 10/1991 | Stewart et al. | 205/364 |
| 5,719,099 A | | 2/1998 | Bhat | |
| 5,800,716 A | * | 9/1998 | Clarke et al. | 210/711 |
| 5,985,778 A | | 11/1999 | Bhat | |
| 6,054,074 A | * | 4/2000 | Wu et al. | 264/37.29 |
| 6,191,068 B1 | | 2/2001 | Bhat | |
| 6,313,368 B1 | | 11/2001 | Bhat | |
| 6,388,165 B1 | * | 5/2002 | Bhat | 588/313 |
| 6,656,247 B1 | * | 12/2003 | Genik-Sas-Berezowsky et al. | 75/710 |
| 7,419,605 B2 | * | 9/2008 | Zhuang | 210/725 |
| 2004/0018133 A1 | * | 1/2004 | Radway | 423/244.05 |
| 2005/0116395 A1 | * | 6/2005 | Tsai | 264/655 |
| 2008/0223098 A1 | * | 9/2008 | Taulbee | 71/61 |

FOREIGN PATENT DOCUMENTS

| | | | |
|---|---|---|---|
| AT | A171489 | * | 10/1992 |
| AT | 396 101 B | | 6/1993 |
| JP | 63288932 | * | 2/1989 |

OTHER PUBLICATIONS

International Preliminary Report on Patentability issued May 4, 2010 for PCT/US2008/081443.

* cited by examiner

*Primary Examiner* — Melvin C Mayes
*Assistant Examiner* — Sheng H Davis
(74) *Attorney, Agent, or Firm* — Barnes & Thornburg LLP

(57) ABSTRACT

Methods for treatment a heavy metal-contaminated solid, semi-solid, liquid or gaseous matrix with magnesium oxide, magnesium sulfite, magnesium sulfate, magnesium chloride, magnesium hydroxide, and mixtures of any two or more of these. Methods for treatment of a solid or semi-solid waste containing unacceptable levels of leachable aluminum and reactive metallic aluminum-containing waste with magnesium oxide, magnesium sulfite, magnesium sulfate, magnesium hydroxide, magnesium chloride, and mixtures of any two or more of these.

3 Claims, 2 Drawing Sheets

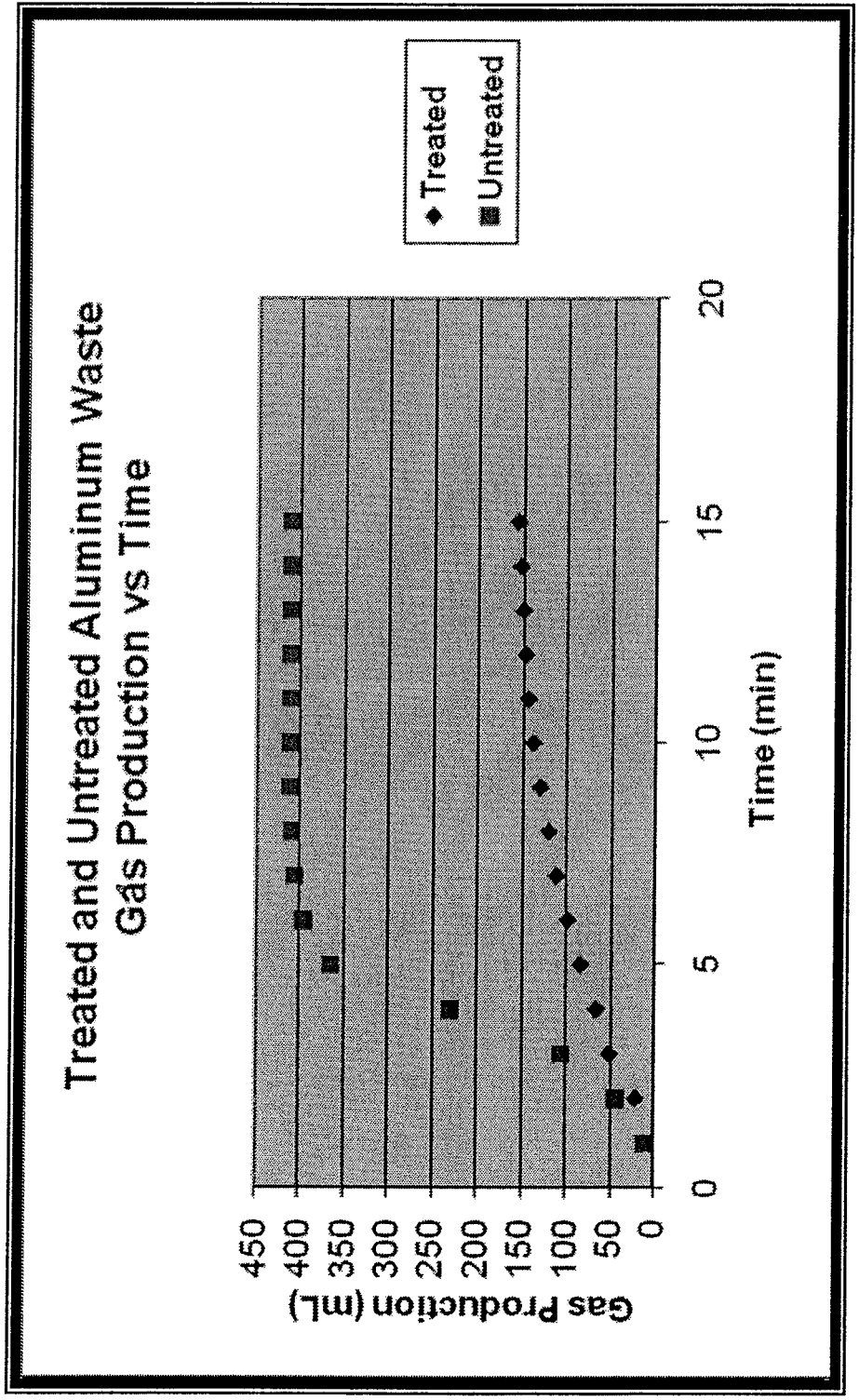
FIGURE 1 – GAS PRODUCTION FROM TREATED AND UNTREATED METALLIC ALUMINUM-CONTAINING WASTES

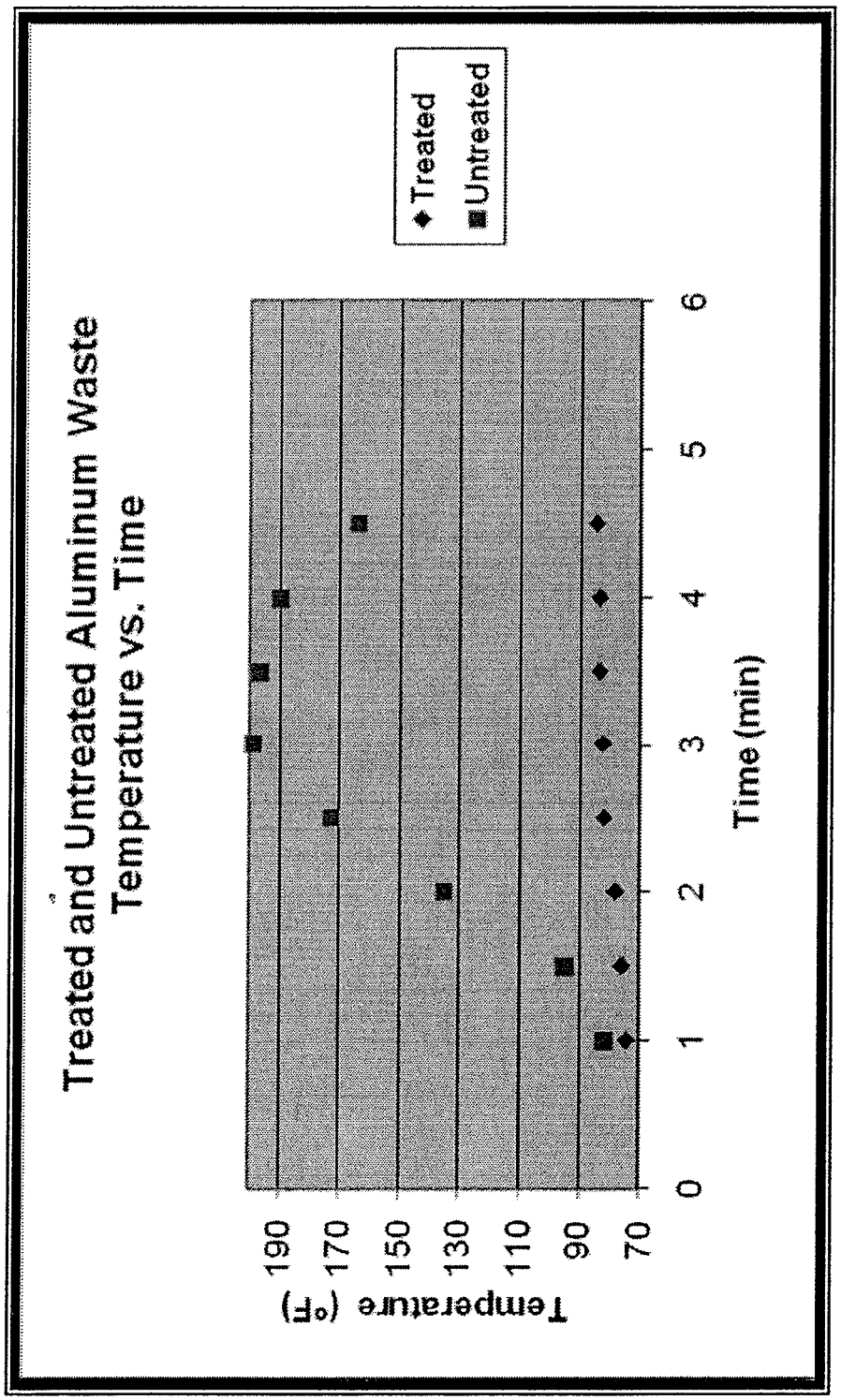
FIGURE 2 – HEAT GENERATION FROM TREATED AND UNTREATED METALLIC ALUMINUM-CONTAINING WASTES

METHOD FOR STABILIZATION AND/OR FIXATION OF LEACHABLE METALS

CROSS REFERENCE TO RELATED APPLICATIONS

This application claims the benefit under 35 U. S. C. §119(e) to U.S. Ser. No. 60/984,392, filed Nov. 1, 2007, U.S. Ser. No. 61/075,099 filed Jun. 24, 2008, and U.S. Ser. No. 61/102,969 filed Oct. 6, 2008. The disclosures of U.S. Ser. No. 60/984,392, U.S. Ser. No. 61/075,099 and U.S. Ser. No. 61/102,969 are hereby incorporated herein by reference.

FIELD OF INVENTION

This invention related to the treatment of waste products and byproducts.

BACKGROUND OF INVENTION

There are numerous multi-step, sequential-step, and more recently, single-step methods that have been disclosed in the literature to prevent the leaching of metals from solids, semi-solids, liquids and/or gaseous complex matrices contained in FGD wastes. If stabilized properly, the FGD waste can be rendered suitable for disposal in a sanitary landfill.

Douglas U.S. Pat. No. 4,671,882 discloses a multi-step process for heavy metal stabilization. Douglas does not prefer to use limestone. According to Douglas, the use of limestone results in the production of carbon dioxide gas when added to acid solution. This carbon dioxide would adversely affect the pH-increasing step essential to Douglas's multi-step heavy metal stabilization process.

Stanforth U.S. Pat. Nos. 4,889,640 and 5,037,479 suggest that limestone is not as effective in the disclosed heavy metal stabilization processes because it is a nonreactive form of calcium and/or magnesium carbonate.

Bhat U.S. Pat. Nos. 5,719,099; 5,985,778; 6,191,068; 6,313,368; and, 6,388,165 all disclose various single step and/or single products or methods for stabilization of heavy metals, acid gas removal and pH control in various contaminated matrices. The compositions comprise various combinations of phosphate-, aluminum-, and alkali-containing materials. Of the seventeen metals tested by Bhat in the referenced patents, all rated "fair" or "poor" in stabilizing two of the metals—Arsenic (As) and Selenium (Se).

The disclosures of all of the above references are hereby incorporated herein by reference. This listing is not intended to be a representation that a complete search of all relevant art has been made, or that no more pertinent art than that listed exists, or that the listed art is material to patentability. Nor should any such representation be inferred.

DISCLOSURE OF INVENTION

According to an aspect of the invention, a method of treating heavy metal-contaminated solid, semi-solid, liquid or gaseous matrix comprises treating the metal-contaminated solid, semi-solid, liquid or gaseous matrix with magnesium oxide, magnesium sulfite, magnesium sulfate, magnesium chloride, magnesium hydroxide, and mixtures thereof.

According to this aspect, magnesium oxide, magnesium sulfite, magnesium sulfate, magnesium hydroxide, and magnesium chloride are applied individually, sequentially, or in combination.

According to this aspect, the magnesium oxide, magnesium sulfite, magnesium sulfate, magnesium hydroxide, and magnesium chloride are not from a group of calcium-bearing compounds, such as but not limited to calcium oxide, calcium hydroxide, or lime kiln dust.

According to these aspects, the method further comprises combining at least one of: calcium oxide; calcium hydroxide; dolomitic lime; dolomitic hydrated lime; and, mixtures of any two or more of these, with the magnesium oxide, magnesium sulfite, magnesium sulfate, magnesium chloride, magnesium hydroxide, and mixtures of any two or more of these prior to treatment of the metal-contaminated solid, semi-solid, liquid or gaseous matrix.

According to another aspect of the invention, a method for treatment of a solid or semi-solid waste containing unacceptable levels of leachable aluminum comprises mixing the solid or semi-solid waste with a reagent including at least one of: magnesium oxide; magnesium sulfite; magnesium sulfate; magnesium hydroxide; magnesium chloride; and, mixtures of any two or more of these, under conditions that support a reaction between the reagent and the waste such that the aluminum will be converted to a nonleachable form which is relatively stable.

According to this aspect, the reagent including at least one of: magnesium oxide; magnesium sulfite; magnesium sulfate; magnesium hydroxide; magnesium chloride; and, mixtures of any two or more of these comprises at least one of a coal combustion product and a byproduct from a flue gas scrubber system process that includes at least one of magnesium oxide, magnesium hydroxide and mixtures thereof in the process.

According to these aspects, the method further comprises combining at least one of: calcium oxide; calcium hydroxide; dolomitic lime; dolomitic hydrated lime; and, mixtures of any two or more of these, to the magnesium oxide, magnesium sulfite, magnesium sulfate, magnesium chloride, magnesium hydroxide, and mixtures of any two or more of these prior to treatment of the solid or semi-solid waste containing unacceptable levels of leachable aluminum.

According to another aspect of the invention, a method for treatment of a solid or semi-solid waste containing unacceptable levels of reactive metallic aluminum-containing waste comprises mixing the solid or semi-solid waste with a reagent including at least one of: magnesium oxide; magnesium sulfite; magnesium sulfate; magnesium hydroxide; magnesium chloride; and, mixtures of any two or more of these, under conditions that support a reaction between the reagent and the waste such that the reactive metallic aluminum will be converted to a form which is stable and nonreactive.

According to this aspect, the reagent including at least one of: magnesium oxide; magnesium sulfite; magnesium sulfate; magnesium hydroxide; magnesium chloride; and, mixtures of any two or more of these comprises at least one of a coal combustion product and a byproduct from a flue gas scrubber system process that includes at least one of magnesium oxide, magnesium hydroxide and mixtures thereof in the said process.

According to these aspects, the method further comprises combining at least one of: calcium oxide; calcium hydroxide; dolomitic lime; dolomitic hydrated lime; and, mixtures of any two or more of these, to the mixture comprised of magnesium oxide, magnesium sulfite, magnesium sulfate, magnesium chloride, magnesium hydroxide, and mixtures thereof prior to treatment of the solid or semi-solid waste containing unacceptable levels of reactive metallic aluminum-containing waste.

According to another aspect of the invention, a method is provided for treatment of a solid or semi-solid waste containing unacceptable levels of leachable aluminum. The solid or semi-solid waste containing unacceptable levels of leachable aluminum is combined with a mixture comprising a combination of: at least one of coal combustion products and byproducts from a flue gas scrubber process that utilizes at least one of soda ash ($Na_2CO_3$), nahcolite ($NaHCO_3$), trona ($Na_2CO_3/NaHCO_3$), sodium sulfite ($Na_2SO_3$), sodium hydroxide (NaOH), potassium hydroxide (KOH), magnesite ($MgCO_3$), dolomite ($CaCO_3/MgCO_3$) and combinations of these; and a reagent including at least one of: magnesium oxide; magnesium sulfite; magnesium sulfate; magnesium hydroxide; magnesium chloride; and, mixtures of any two or more of these, under conditions that support a reaction between the said combination and the waste, converting the aluminum to a nonleachable form which is relatively stable.

According to this aspect, the reagent including at least one of: magnesium oxide; magnesium sulfite; magnesium sulfate; magnesium hydroxide; magnesium chloride; and, mixtures of any two or more of these comprises at least one of a coal combustion product and a byproduct from a flue gas scrubber system process that includes at least one of magnesium oxide, magnesium hydroxide and mixtures thereof.

According to another aspect of the invention, a method is provided for treatment of a solid or semi-solid waste containing unacceptable levels of reactive metallic aluminum containing waste. The solid or semi-solid waste containing reactive metallic aluminum containing waste is combined with a mixture comprising a combination of: at least one of coal combustion products and byproducts from a flue gas scrubber process that utilizes at least one of soda ash ($Na_2CO_3$), nahcolite ($NaHCO_3$), trona ($Na_2CO_3/NaHCO_3$), sodium sulfite ($Na_2SO_3$), sodium hydroxide (NaOH), potassium hydroxide (KOH), magnesite ($MgCO_3$), dolomite ($CaCO_3/MgCO_3$) and combinations of these; and a reagent including at least one of: magnesium oxide; magnesium sulfite; magnesium sulfate; magnesium hydroxide; magnesium chloride; and, mixtures of any two or more of these, under conditions that support a reaction between the said combination and the waste, converting the reactive metallic aluminum to a form which is stable and nonreactive.

According to this aspect, the reagent including at least one of: magnesium oxide; magnesium sulfite; magnesium sulfate; magnesium hydroxide; magnesium chloride; and, mixtures of any two or more of these comprises at least one of a coal combustion product and a byproduct from a flue gas scrubber system process that includes at least one of magnesium oxide, magnesium hydroxide and mixtures thereof.

According to another aspect of the invention, a method is provided for treatment of a solid or semi-solid waste containing unacceptable levels of leachable hazardous metals. The method comprises combining the solid or semi-solid waste containing unacceptable levels of leachable hazardous metals with a combination of: at least one of coal combustion products and byproducts from a flue gas scrubber process that utilizes at least one of soda ash ($Na_2CO_3$), nahcolite ($NaHCO_3$), trona ($Na_2CO_3/NaHCO_3$), sodium sulfite ($Na_2SO_3$), sodium hydroxide (NaOH), potassium hydroxide (KOH), magnesite ($MgCO_3$), dolomite ($CaCO_3/MgCO_3$) and combinations of these; and a reagent including at least one of: magnesium oxide; magnesium sulfite; magnesium sulfate; magnesium hydroxide; magnesium chloride; and, mixtures of any two or more of these, under conditions that support a reaction between the said combination and the waste, converting the leachable metals to a nonleachable form which is relatively stable.

According to this aspect, the reagent including at least one of: magnesium oxide; magnesium sulfite; magnesium sulfate; magnesium hydroxide; magnesium chloride; and, mixtures of any two or more of these comprises at least one of a coal combustion product and a byproduct from a flue gas scrubber system process that includes at least one of magnesium oxide, magnesium hydroxide and combinations thereof.

BRIEF DESCRIPTION OF THE DRAWINGS

The invention may best be understood by referring to the following detailed description and accompanying drawings which illustrate the invention. In the drawings:

FIG. 1 illustrates a comparison of off-gassing versus time of treated and untreated samples of metallic aluminum-containing wastes; and, FIG. 2 illustrates a comparison of temperature versus time of treated and untreated samples of metallic aluminum-containing wastes.

DETAILED DESCRIPTIONS OF ILLUSTRATIVE EMBODIMENTS

The invention is disclosed in the context of the treatment of waste products and byproducts from flue gas desulfurization (FGD), particularly those FGD systems that utilize alternative alkali materials in lieu of lime-based reagents or limestone, such as soda ash ($Na_2CO_3$), nahcolite ($NaHCO_3$), trona ($Na_2CO_3/NaHCO_3$), sodium sulfite ($Na_2SO_3$), sodium hydroxide (NaOH), potassium hydroxide (KOH), magnesite ($MgCO_3$), dolomite ($CaCO_3/MgCO_3$) and others in various combinations. The treated FGD may be further utilized to treat, stabilize, or solidify other waste streams, in particular, metallic aluminum containing wastes.

Sulfur dioxide ($SO_2$) emissions from the combustion of coal in coal-fired systems require removal from exhaust gases (sometimes referred to as flue gases) prior to release of the gases into the environment. Many materials have been employed to treat the flue gases. The physical nature of these materials varies from wet scrubbing to injection of dry powdered materials and is dependent upon the overall pollution control process system employed.

$SO_2$ is an acid gas and thus the typical slurries or other materials used to remove ("scrub") the $SO_2$ from the flue gases are alkaline. Therefore the majority of wet scrubber systems utilize aqueous slurries of lime-based reagents (e.g. calcium sulfite) or limestone to neutralize the sulfurous and/or sulfuric acids produced from the dissolution and subsequent oxidation of flue gas in scrubbing systems.

The reaction taking place in wet scrubbing using a $CaCO_3$ (limestone) slurry produces $CaSO_3$ (calcium sulfite) and can be expressed as:

$$CaCO_3 \text{ (solid)} + SO_2 \text{ (gas)} \rightarrow CaSO_3 \text{ (solid)} + CO_2 \text{ (gas)}$$

Other wet scrubbing systems use lime-based slurries to remove $SO_2$ from the flue gas:

$$Ca(OH)_2 \text{ (solid)} + SO_2 \text{ (gas)} \rightarrow CaSO_3 \text{ (solid)} + H_2O \text{ (liquid)}$$

When using any of the above mentioned wet scrubbing systems that are based upon limestone slurries or lime-based reagents large volumes of waste product is produced and must be hauled away for disposal. Such practice is common among power plants located in areas where landfill space is abundant or is a cost-effective disposal alternative.

In densely populated areas, or where land disposal is cost prohibitive or prohibited by regulation, some operators of wet FGD scrubbing systems add an additional step to further oxidize the $CaSO_3$ (calcium sulfite) to produce marketable $CaSO_4 \cdot 2H_2O$ (gypsum):

$$CaSO_3 \text{ (solid)} + \tfrac{1}{2}O_2 \text{ (gas)} + 2H_2O \text{ (liquid)} \rightarrow CaSO_4 \cdot 2H_2O \text{ (solid)}$$

Other alkali materials beside lime-based reagents and limestone offer flexibility and versatility in the operation, maintenance and waste disposal requirements of FGD scrubber systems. These other materials are typically more expensive than limestone and are more often used:
1. where the volume of waste gas to be treated is small (compared to those from large power plants);
2. where other factors such as transportation cost of the alkali material is economical;
3. when required or necessitated by local or regional regulatory constraints; or
4. when any combination of these and other economic, technical, or regulatory issues make this alternative economically and environmentally viable More common alternative alkali materials used in lieu of lime-based reagents or limestone include soda ash ($Na_2CO_3$), nahcolite ($NaHCO_3$), trona ($Na_2CO_3/NaHCO_3$), sodium sulfite ($Na_2SO_3$), sodium hydroxide (NaOH), potassium hydroxide (KOH), magnesite ($MgCO_3$), dolomite ($CaCO_3/MgCO_3$) and others in various combinations.

In dry scrubber systems, where dry lime-based reagents, limestone, or alternative alkali materials are used to remove sulfur oxides ($SO_x$), hydrogen sulfide ($H_2S$), hydrochloric acid (HCl), and hydrofluoric acid (HF) from flue gas emissions, the material from dry scrubbers is processed through an electronic precipitator or other collection system and captured. The resulting waste byproduct is referred to as dry FGD ash, dry FGD material, or lime spray dryer ash and contains combinations of coal combustion products, coal combustion byproducts, and unused scrubber reagents. These wastes often contain levels of metals and other chemical constituents that are not stabilized and can easily leach into surface or groundwater and pose an environmental threat if disposed of improperly. In addition to the potential leaching of metals into the environment, some FGD waste streams have a pH that is also potentially harmful to the environment if not managed properly.

As previously noted, one of the alternative alkali materials used in FGD systems in lieu of lime-based reagents or limestone is trona ($Na_2CO_3/NaHCO_3$). Trona is a natural mineral and is receiving more widespread use in dry FGD systems. Dry powdered trona is blown into a stream of coal combustion products (CCP) and acidic flue gases. The gases react with the trona to form by-products. The CCPs, by-products, and any excess trona are removed from the air stream using an electrostatic precipitator portion of the flue gas desulfurization (FGD) system and captured for disposal.

Waste generated from trona-based contains various metals and other chemical attributes that may pose an environmental threat if the waste is placed in a landfill or re-used (such as in coal ash placement). In particular, arsenic (As) and selenium (Se) in an untreated trona-based FGD waste are usually above the regulatory limits and must be treated prior to land disposal or beneficial re-use. Some states (e.g., Pennsylvania) require maximum acceptable leachate concentrations for various contaminants for coal ash placement (Table 1).

TABLE 1

COAL ASH PLACEMENT CRITERIA
(State of Pennsylvania Department of the Environment)
1. Maximum Acceptable Leachate Concentration

| Constituent | (mg/L) |
|---|---|
| Aluminum | 5.0 |
| Antimony | 0.15 |
| Arsenic | 1.25 |

TABLE 1-continued

COAL ASH PLACEMENT CRITERIA
(State of Pennsylvania Department of the Environment)
1. Maximum Acceptable Leachate Concentration

| Constituent | (mg/L) |
|---|---|
| Barium | 50 |
| Boron | 31.50 |
| Cadmium | 0.13 |
| Chromium | 2.5 |
| Copper | 32.5 |
| Iron | 7.5 |
| Lead | 1.25 |
| Manganese | 1.25 |
| Mercury | 0.05 |
| Molybdenum | 4.38 |
| Nickel | 2.5 |
| Selenium | 1.00 |
| Zinc | 125 |
| Sulfate | 2,500 |
| Chloride | 2,500 |
| 2. pH | (between 7.0 and 12.5) |

Although many chemical treatment compositions are effective in stabilizing the metals contained in FGD waste to below the applicable regulatory limits, a majority of the treatment regimes, especially those that include lime, lime kiln dust, limestone, or other lime-based reagents or limestone do not result in a treated waste matrix that is both within the regulatory limit for metal leachability and within an acceptable pH range.

As noted above, some operators of wet FGD scrubbing systems that inject $CaCO_3$ (limestone) into the flue gas to remove the $SO_2$ gas produce a slurry containing $CaSO_3$ (calcium sulfite). Some operators of these wet FGD scrubbing systems perform the additional step of further oxidizing the $CaSO_3$ (calcium sulfite) to produce marketable $CaSO_4.2H_2O$ (gypsum).

For those operators that use alternative alkali materials (for example, soda ash ($Na_2CO_3$), nahcolite ($NaHCO_3$), trona ($Na_2CO_3/NaHCO_3$), sodium sulfite ($Na_2SO_3$), sodium hydroxide (NaOH), potassium hydroxide (KOH), magnesite ($MgCO_3$), dolomite ($CaCO_3/MgCO_3$) and others in various combinations) in lieu of lime-based reagents or limestone in wet FGD scrubbing systems, the resulting FGD waste ash has no marketable value and is commonly disposed of in a landfill or monofill.

Table 2 summarizes the results of treatment of trona-based FGD waste with a treating mixture comprising magnesium sulfate (about 20% to about 30%), magnesium sulfite (about 60% to about 70%), magnesium oxide (about 1% to about 10%), and magnesium hydroxide (about 1% to about 10%) blended at a rate of fifteen percent (15%), by weight with a trona-based FGD waste.

TABLE 2

TREATMENT OF TRONA-BASED ASH WITH MIXTURE

| Compounds | Untreated FGD Ash (mg/l) | Treated with Treating Mixture (mg/l) |
|---|---|---|
| Arsenic | 0.7 | 0.40 |
| Barium | 1.0 | 0.20 |
| Cadmium | <0.005 | <0.005 |
| Chromium | <0.01 | <0.01 |
| Lead | <0.01 | <0.01 |
| Mercury | <0.002 | <0.002 |
| Selenium | 1.0 | <0.20 |

TABLE 2-continued

TREATMENT OF TRONA-BASED ASH WITH MIXTURE

| Compounds | Untreated FGD Ash (mg/l) | Treated with Treating Mixture (mg/l) |
|---|---|---|
| Silver | <0.05 | <0.05 |
| pH | 11.0 | 10.17 |

Additional studies indicate that if the FGD waste contains calcium-bearing compounds such as lime, lime kiln dust, limestone, or other lime-based reagents or limestone, the stabilization of metals to below the applicable regulatory limit could not be achieved within a final treated waste that was within an acceptable pH range.

Therefore to achieve both metal stabilization and maintain the treated waste within an acceptable pH range, the source of magnesium sulfate, magnesium sulfite, magnesium oxide, magnesium hydroxide, and if applicable, magnesium chloride, must contain negligible or no calcium sources such as lime, lime kiln dust, limestone, or other lime-based reagents or limestone.

We have also found that when coal combustion byproducts and ash from FGD systems that utilize soda ash ($Na_2CO_3$), nahcolite ($NaHCO_3$), trona ($Na_2CO_3/NaHCO_3$), sodium sulfite ($Na_2SO_3$), sodium hydroxide (NaOH), potassium hydroxide (KOH), magnesite ($MgCO_3$), dolomite ($CaCO_3/MgCO_3$) and other compounds common in coal combustion byproducts and ash from FGD systems is treated with the magnesium sulfate, magnesium sulfite, magnesium oxide, magnesium hydroxide, and if applicable, magnesium chloride, the resulting waste mixture can be further utilized to treat other waste streams.

For example, metallic aluminum-containing waste streams such as those generated by secondary aluminum smelters (e.g., aluminum dross, aluminum grinding dust) have been recently been found to generate high heat when mixed in a municipal or hazardous waste landfill when the metallic aluminum-based waste stream comes in contact with water and sources of alkalinity already in the landfill. This high heat has started landfill fires in several disposal sites. As a result, the applicable regulatory agencies have begun notifying both the waste generators and disposal sites of their concerns about landfill fires after these metallic aluminum-containing industrial wastes are placed in landfills under these conditions.

When alternative alkali materials used in lieu of lime-based reagents or limestone in wet FGD scrubbing systems and treated with the magnesium sulfate, magnesium sulfite, magnesium oxide, magnesium hydroxide, and if applicable, magnesium chloride are subsequently mixed with metallic aluminum-containing wastes, the resulting waste mixture has resulted not only in reduced heat generation but also in buffering the pH and encapsulating the metallic aluminum-containing wastes so that the mixture can be safely disposed of in either an on-site monofill, a municipal solid waste landfill, or at a hazardous waste landfill.

Optionally, the operator can add calcium oxide, calcium hydroxide, dolomitic lime, or dolomitic hydrated lime, individually, sequentially, or in combination to the magnesium oxide, magnesium sulfite, magnesium sulfate, magnesium chloride, magnesium hydroxide and mixtures thereof prior to treatment of the metal-contaminated solid, semi-solid, liquid or gaseous matrix.

Metallic aluminum containing wastes were effectively treated when the wastes and reagents were prepared as follows:

Step 1—Trona-based FGD ash is mixed with the treating mixture at a ratio between about 2:1 and about 4:1. The treating mixture is allowed to cure for ten (10) minutes or more, but preferably for about 24 to about 48 hours. For the purposes of discussion, the thus-treated trona-based FGD ash is sometimes referred to hereinafter as treated trona ash, or TTA.

Step 2—A volume of water is then added to the TTA to achieve a toothpaste consistency. The amount of water required to achieve and maintain this consistency ranges from about 50% to about 100% of the weight of the TTA. For the purposes of discussion, this resulting mixture is sometimes referred to hereinafter as wet treated trona ash, or wTTA.

Step 3—Metallic aluminum-containing waste is added to the wTTA in a ratio of approximately 4:1 to 1:1 by weight of metallic aluminum-containing waste to wTTA. The ratio used depends upon the nature and composition of the metallic aluminum containing waste to be treated. It has also been found that metallic aluminum-containing waste can be effectively treated with the treating mixture alone at a ratio of approximately 2:1 to 4:1 by weight of metallic aluminum to treating mixture.

There is no standardized testing methodology (e.g., ASTM, USEPA) for determining successful treatment regimens for metallic aluminum-containing wastes. Therefore, a 25% solution of sodium hydroxide method was used to assess the reactivity of the aluminum wastes. To establish a baseline, water was added to an untreated waste containing 26% metallic aluminum until a toothpaste-like consistency was achieved. When 0.25 ml of a 25% sodium hydroxide solution was added to the paste, the untreated sample began to vigorously bubble and fizz, followed by smoking and high heat generation. Hydrogen off-gassing, coupled with a distinct acetylene and sulfide gas odor, was observed. After an additional 0.25 ml of 25% sodium hydroxide was added and mixed, the heat reaction was enough to melt the plastic cup containing the sample.

When the treated metallic aluminum-containing waste was titrated with 0.25 ml of the 25% sodium hydroxide solution, a very minor and a very slight sulfide and acetylene odor was observed which quickly dissipated. There was negligible heat generation. When an additional 0.25 ml of the 25% sodium hydroxide solution was added, there was no heat generation or off-gassing as was observed with the untreated samples. When an additional 0.50 ml was added, there was no heat generation or off-gassing.

FIGS. 1 and 2 compare off-gassing and temperature, respectively, versus time, of treated and untreated samples of metallic aluminum-containing wastes.

Another beneficial aspect of the present invention is the treatment of electric arc furnace (EAF) dusts. These EAF dusts are a mixture of metal oxides of iron, zinc, lead, tin, cadmium, chromium, manganese, nickel, copper, and molybdenum. Silica, lime and alumina may also be present in the dust. The dusts are collected by scrubbers, electrostatic precipitators, bag filters, or other known pollution control systems, in electric arc furnace (EAF) and blast furnace steel-making facilities and other iron-making plants. The aforementioned metals are highly mobile and may leach from theses wastes into the environment if not treated prior to disposal.

Table 3 summarizes the results of the treatment of EAF dust waste with about 11% by weight of a reagent comprising:
  about 50% by weight dolomitic hydrated lime (comprising about 45% magnesium hydroxide and about 55% calcium hydroxide); and about 50% by weight of a reagent containing magnesium sulfate (about 20% to about 30%), magnesium sulfite (about 60% to about 70%), magnesium oxide (about 1% to about 10%), and magnesium hydroxide (about 1% to about 10%).

TABLE 3

TREATMENT OF AND ELECTRIC ARC FURNACE (EAF) DUST

| Compound | Untreated (ppm) | Treated (ppm) |
|---|---|---|
| Lead | 68 | <0.10 |
| Cadmium | 6.9 | <0.05 |
| Zinc | 1800 | <0.50 |
| pH | 12.46 | 9.33 |

It will be understood that variations and modifications may be effected without departing from the spirit and scope of the novel concepts of this invention.

What is claimed is:

1. A method for treatment of a solid or semi-solid waste containing unacceptable levels of reactive metallic aluminum-containing waste to reduce off-gassing of hazardous gases, the method comprising mixing the solid or semi-solid waste with a reagent including at least one of: magnesium sulfite; magnesium sulfate; magnesium chloride; and, mixtures of any two or more of these, under conditions that support a reaction between the reagent and the aluminum-containing waste such that the reactive metallic aluminum is converted to a form which is stable and nonreactive, wherein the reagent further includes water.

2. The method as claimed in claim 1 further comprising combining at least one of: calcium oxide; calcium hydroxide; dolomitic lime; dolomitic hydrated lime; and, mixtures of any two or more of these, to the magnesium sulfite, magnesium sulfate, magnesium chloride, and mixtures of any two or more of these prior to treatment of the solid or semi-solid waste containing unacceptable levels of reactive metallic aluminum-containing waste.

3. The method as claimed in claim 1, wherein the conditions include mixing the solid or semi-solid waste with a reagent at a temperature of less than 90 degrees Fahrenheit.

* * * * *